US006803091B2

(12) United States Patent
Winterowd et al.

(10) Patent No.: US 6,803,091 B2
(45) Date of Patent: Oct. 12, 2004

(54) EDGE SEALANT FORMULATION FOR WOOD-BASED PANELS

(76) Inventors: Jack G. Winterowd, 2110 Brookmonte Dr., Puyallup, WA (US) 98372; Charles E. Lewis, 32723 19th Pl. South, #M104, Federal Way, WA (US) 98003; Jerry D. Izan, 15615 40th Ave. E., Tacoma, WA (US) 98446; Roger M. Shantz, 451 Burger Pl., Enumclaw, WA (US) 98022

( * ) Notice: Subject to any disclaimer, the term of this patent is extended or adjusted under 35 U.S.C. 154(b) by 0 days.

(21) Appl. No.: 10/606,335

(22) Filed: Jun. 24, 2003

(65) Prior Publication Data

US 2004/0013857 A1 Jan. 22, 2004

Related U.S. Application Data

(62) Division of application No. 09/619,010, filed on Jul. 19, 2000, now Pat. No. 6,608,131.
(60) Provisional application No. 60/144,605, filed on Jul. 20, 1999.

(51) Int. Cl.$^7$ ................................................. B32B 3/02
(52) U.S. Cl. ....................................................... 428/194
(58) Field of Search ................................ 428/192, 194; 524/487, 488, 73, 74

(56) References Cited

U.S. PATENT DOCUMENTS 4,021,398 A     5/1977   Gilman et al.
4,141,871 A  *  2/1979   Shimp et al. ................ 524/389
4,218,516 A     8/1980   Meyer et al.
4,317,755 A     3/1982   Gregory
4,683,260 A     7/1987   Wickert
4,722,953 A     2/1988   DeRuiter et al.
4,879,160 A    11/1989   Knudson et al.
4,897,291 A  *  1/1990   Kim ........................... 427/393
5,308,694 A     5/1994   Andersson
5,312,863 A     5/1994   Van Rheenen et al.
5,320,872 A     6/1994   McNeel et al.
5,407,980 A     4/1995   Pizzi et al.
5,460,644 A    10/1995   Thomassen
5,529,811 A     6/1996   Sinko
5,763,338 A     6/1998   Sean
5,891,294 A     4/1999   Shih et al.
5,993,534 A    11/1999   Winterowd et al.
6,177,510 B1    1/2001   Saam
6,207,290 B1    3/2001   Blum et al.
6,489,387 B2   12/2002   Mallya et al.
6,608,131 B1 * 8/2003   Winterowd et al. ......... 524/487

OTHER PUBLICATIONS

Fracheboud, M. et al., "New Sesquiterpenes from Yellow Wood of Slippery Elm," *Forest Prod. J.* 18(2):37–40, Feb. 1968.

* cited by examiner

Primary Examiner—Alexander S. Thomas

(57) ABSTRACT

In one aspect, the present invention provides a formulation for sealing the edge of a wood-based panel. The formulation includes a butylacrylate latex, a solution of a wax in oil, a surfactant, and water. In another aspect of the invention, a wood-based panel that is edge-sealed with a sealant formulation is provided.

5 Claims, No Drawings

EDGE SEALANT FORMULATION FOR WOOD-BASED PANELS

CROSS-REFERENCE TO RELATED APPLICATION

This application s a division of U.S. continuation-in-part patent application Ser. No. 09/619,010, now U.S. Pat. No. 6,608,131 filed Jul. 19, 2000, which is a continuation-in-part of abandoned U.S. provisional patent application Serial No. 60/144,605, filed Jul. 20, 1999, expressly incorporated herein by references in its entirety, the benefit of the priority of which is hereby claimed under 35 U.S.C. 120 and §119, respectively.

FIELD OF THE INVENTION

The present invention relates to a formulation for sealing oriented strandboard edges to prevent edge swelling.

BACKGROUND OF THE INVENTION

Oriented strandboard (OSB) panels are commonly used as subfloor sheathing in residential homes. These panels are installed directly on top of floor joists prior to installation of the walls and roof of the structure. Thus, the subfloor is exposed to external environmental conditions for a period of time during the general process of building a house. It is common for the subfloor panels to be subjected to rain during this process. Sill plates, which vertically protrude from the perimeter of the floor, can literally convert the floor into a basin. An uncovered subfloor can accumulate as much as two inches of water during a rainstorm. In some cases the accumulated water will be left to absorb into the subfloor panels for several days during the home-building process.

Unfortunately, exposure to water causes most OSB panels to undergo severe, irreversible thickness swell. Panels, which are manufactured at a thickness of 720 mils (0.720 inch), can actually swell to edge thickness values in excess of 1000 mils. Upon drying, these same panels will typically have an edge thickness of approximately 900 mils. The worst aspect of the swelling behavior is that the OSB swells to a greater extent on the edge of the panel than it does in regions towards the center of the panel. Panels subjected to a wet and redry cycle can be 20 to 150 mils thicker at the panel edges than they are 4 inches proximal to the edges. This phenomenon is typically referred to as differential edge swell. For the purpose of this application differential edge swell is defined as the edge thickness of a water-swollen OSB panel minus the caliper at a location that is 4 inches proximal to the edge point:

DIFFERENTIAL EDGE SWELL=(THICKNESS AT PANEL EDGE)−(THICKNESS 4 INCHES PROXIMAL TO THE EDGE)

There are several factors that effect OSB differential edge swell. It is helpful to review some of the factors that are believed to effect differential edge swell.

Consider a subfloor comprised of OSB panels at a home construction site. Builders are instructed to leave small gaps between the panels in the floor system in order to accommodate linear expansion. During a rainstorm there is a natural tendency for the accumulated rainwater to flow into these gaps or seams in the floor. Floor joists or protruding tongues reside directly beneath the seams, thus the water that flows into the seams can not readily drain. In this manner the edges of the OSB panels in a wet floor system are exposed to just as much water as the major, top-side surfaces of the panels.

The orientation of the strands in OSB is almost exclusively parallel to the plane of the panel. This orientation results in relatively nonporous major faces and highly porous edges. Thus, the porous edges of OSB panels absorb water faster than do the relatively nonporous major surfaces. An interesting consequence of the anisotropic pore structure of OSB is that brief exposure to water actually produces maximum differential edge swell. When OSB is subjected to water for a relatively long period of time, the interior regions of the panel have time to fully hydrate, and swell to become nearly as thick as the perimeter of the panel.

Most strands in OSB have been compressed to density values that are significantly greater than that of the virgin wood. Generally, when compressed wood is exposed to water it springs back to its original dimensions. Thus, compressed strands will tend to increase in thickness to at least their original dimensions as they absorb water. Upon drying, the dimensions of these strands do not return to the compressed state.

Another significant factor, which effects thickness swell in an OSB panel, relates to the wet strength of the strand-to-strand bonds. Strands in an OSB panel are held together with adhesives, such as phenol/formaldehyde (PF) resins or methylene-diphenyldiisocyanate (MDI). As adjacent strands in an OSB panel undergo dramatic dimensional change, there are considerable stresses placed on the strand-to-strand bonds. Some of the water that penetrates an OSB panel can absorb into the adhesive glue-lines and weaken them. Phenolic glue-lines can be especially susceptible to water absorption. The combination of physical stresses and low wet strength causes a number of these strand-to-strand bonds to rupture. In many cases, strands in the panel are bent over each other like a loaded catapult. As bonds rupture, strands are able to relax into a more linear shape, which increases the thickness of the panel. This part of the thickness swelling process is also not reversible with drying. It should be noted that strand-to-strand bonds near the edges of the panel will have fewer neighboring strands for load sharing as compared to strand-to-strand bonds in the interior region of the panel. Thus, more strand-to-strand bonds would be expected to rupture at the edge of a panel than in the interior regions of the panel.

In summary, excessive thickness swell, and especially, excessive differential edge swell in OSB panels are facilitated by (1) the seams in a floor system that trap rainwater against the edges of OSB panels; (2) the relatively porous nature of the OSB edges; (3) the compressed state of strands in OSB; and (4) the residual stresses in flexed strands and the rupturing of wet strand-to-strand bonds.

The consequences of differential edge swell can be significant. When differential edge swell occurs during residential home construction it manifests itself as ridges along the seams in the subfloor. Builders are often required to sand the seams in the subfloor in order to remove these ridges and create a flat, smooth subfloor. Obviously, the practice of sanding the subfloor is costly, time-consuming, and frustrating to the builder.

There are available solutions to the problem of differential edge swell. In wet environments the builder can avoid the differential edge swell problem by using plywood as the subfloor panel. The thickness swell associated with plywood when it is subjected to water is usually so subtle that sanding is not required. Unfortunately, plywood is more expensive than OSB. A desirable panel for the builder to use would be one that is as inexpensive as OSB, but has the thickness swelling properties of plywood.

OSB manufacturers have recognized this opportunity for years. Essentially all North American manufacturers of OSB subfloor panels attempt to improve the dimensional stability of the panel by applying a paint-like formulation to all four edges of the OSB subfloor panel. Subsequent to application this type of formulation dries into a hydrophobic film, which binds strongly to the OSB substrate and inhibits the absorption of water into the edge of the panel. Thus, the edge sealant helps to reduce the degree of differential edge swell experienced by the panel when it is exposed to water during the construction process.

The edge sealant technology is not the only method that can be used by OSB manufacturers to make the panel more resistant to differential edge swell. Addition of wax to the individual strands makes them more hydrophobic and significantly decreases the rate at which an OSB panel absorbs water. Apparently, all OSB manufacturers apply wax to the strands in order to make them more hydrophobic. Unfortunately, the addition of wax beyond a level of about 1% by weight significantly interferes with the strand-to-strand adhesive bonds. Thus, OSB manufacturers are limited in the amount of wax that can be added to OSB to improve thickness swell.

It is also known that increasing the amount of bonding resin in the board can significantly improve the dimensional stability of OSB. Unfortunately, the cost of using higher levels of adhesive is significantly greater than the cost of applying an edge sealant. Thus, application of an edge sealant is a low-cost method for improving the dimensional stability properties of the OSB.

There are many patents relating to general sealant compositions for wood products. For example U.S. Pat. Nos. 4,722,953; 4,317,755; and 4,683,260 all relate to sealants for wood products.

U.S. Pat. No. 4,897,291 describes a sealant suitable for use on OSB that is primarily composed of water (20–80 weight %), a styrene-butadiene latex with a $T_g$ of about −32° C. (2–20 weight %), a styrene-acrylic latex with a $T_g$ of about 20° C. (0–15%), a wax hydrophobic filler (3–25 weight %), and a water-soluble methyl siliconate (0.03–1.5 weight %). A preferred hydrophobic filler was paraffin wax, and a preferred water-soluble methyl siliconate was sodium methyl siliconate.

Edge sealants are generally applied to OSB panels at the OSB mill. It is common for liquid, edge sealant formulations to be delivered in 275-gallon totes to OSB mills in North America. Thus, these formulations must be stable and resistant to settling or any other type of gross phase separation during shipping and storage. Stored edge sealant is typically transferred out of the totes through hoses by use of pumps. Filters are placed in the hose line in order to remove any coarse particles in the edge sealant. The filtered edge sealant is then transferred to an array of reciprocating spray applicators inside of a booth. Stacks of panels, known as units, are transported into the booth and sprayed on the four vertical sides with edge sealant. The top and bottom major faces of the panels are not sprayed. Successful formulations dry shortly after application to the panels without the use of heating or ventilation equipment. The fresh coat of edge sealant on units of OSB must be compatible with water-based stencil paint that is used to label the OSB units. Thus, the drying time of the formulation must be relatively fast. However, an attempt is made to collect and recycle sprayed formulation that has missed the panel. Therefore, the formulation must dry sufficiently slowly to be recyclable in the spray booth collection system.

Sprayed edge sealant that is not transferred onto the OSB is known as overspray. Amazingly, overspray can represent over 50% of the processed edge sealant. There are several significant problems associated with overspray. Generally, the spray booths are open at the front and back ends in order to allow OSB units to flow into and out of the booth. It is common for edge sealant overspray to escape out of the booth through these entrance and exit points. Conventional, commercial edge sealants have a low viscosity and readily atomize in spray equipment into fine droplets. These fine droplets can remain airborne for substantial periods of time outside of the spray booth and represent some level of respiratory hazard to employees working in the plant. The overspray that is contained within the booth has a tendency to accumulate on nozzles, walls, and air filters as well as the floor. Thus, once every two or three days, the spray booth must be shut down for cleaning. Of course, the overspray also represents a significant material loss at the plant which creates a financial hardship. Existing suppliers of OSB edge sealant have been repeatedly requested to increase the viscosity values of their edge sealants, but have not done so.

Most edge sealant formulations are colored and are applied at a level that imparts a solid, uniform, attractive appearance to the OSB unit, which helps to promote sales and marketing efforts. Simultaneously, the formulation must not be applied at a level that is too high. When this occurs, adjacent panels become bonded together in the stack as the formulation dries. These process constraints often force OSB manufacturers to apply the sealant formulation at a level of about 25–45 lb/Msqft of edge surface.

After a sealant formulation has been applied to the edges of an OSB panel and dried it must reduce the thickness swelling that typically occurs when the panel is exposed to water. Thus, the formulation must dry to form a film that bonds strongly to the OSB and is relatively elastic so that it can expand and stretch as the OSB swells. However, the dried edge sealant must not be excessively soft and sticky. Sealed edges that are too soft and sticky have been associated with a phenomenon known as tongue-and-groove clicking. Clicking has been observed in homes with tongue-and-grooved subfloors. A floor flexes as a homeowner walks across it, and this strain causes movement in the tongue-and-groove seams. A clicking sound can be observed as sticky edge sealant on the surface of the tongue retracts from sticky edge sealant on the groove wall. Unfortunately, subfloor replacement is the only known remedy for a clicking tongue-and-groove seam.

It is also important for the dried edge sealant to be resistant to color crocking. For instance, it is not acceptable for a sealed, colored edge sealant to transfer onto an installers hands during the installation process. There exists a need for a liquid edge sealant formulation suitable for use in a conventional OSB mill having the following properties and characteristics:

(1) the formulation exhibits no phase separation or settling for storage periods of at least three months at ambient conditions;

(2) the formulation has a viscosity value, which is sufficiently low for pumping, filtering, and spraying, but is high enough to minimize overspray and excessively fine droplet formation in the spray booth;

(3) the formulation dries quickly subsequent to panel application, but overspray dries slowly;

(4) the formulation is water-based, but it dries to yield a film that is highly water repellent and significantly improves the dimensional stability of wet OSB;

(5) the formulation dries to yield an intensely colored, attractive coating on the edge of the OSB unit at an application rate of about 25–45 lb/Msqft, but the colored coating does not transfer onto an installer's hands during the installation process; and (6) the formulation adheres strongly to the edge of the OSB as it dries into a film and the film is sufficiently elastic to expand without cracking as the OSB swells, however, the film is hard enough to avoid the tongue-and-groove clicking phenomenon.

A number of these requirements appear to represent physical property contradictions. The present invention seeks to fulfill these needs and provides further related advantages.

SUMMARY OF THE INVENTION

In one aspect, the present invention provides a formulation for sealing the edge of a wood-based panel. The formulation includes a butylacrylate latex, a solution of a wax in oil, a surfactant, and water.

In another aspect of the invention, a wood-based panel that is edge-sealed with a sealant formulation is provided.

DETAILED DESCRIPTION OF THE PREFERRED EMBODIMENT

In one aspect, the present invention provides a stable, single-component liquid formulation that can be sprayed onto the edge of OSB panels at a wet spread rate of about 25–50 lb/Msqft and dried to yield a coating which substantially retards the rate of edge thickness swell and thereby reduces differential edge swell. The formulation includes water (20–60% by weight); a butylacrylate latex (10–25% by weight); a solution (10–30% by weight) of a wax in oil; and a surfactant (1–5% by weight) based on salts of long-chain organic acids. Other additives can be included in the formulation such as viscosifying agents, additional emulsifying agents, dispersing aids, colorants, opacifying agents, preservatives, a second latex, coalescing agents, and OSB adhesive wet-strength enhancing agents.

Suitable butylacrylate lattices can be based on copolymers of butylacrylate and styrene or butylacrylate and methacrylate. The latex is preferably stable in a pH range of 7–9. Films cast from the neat latex at a temperature of 20° C. preferably have a $T_g$ of −30° to 0° C. and an ultimate elongation of 1000 to 3000%. The films must exhibit 0–1% swell upon soaking in water at a temperature of 20° C. for 48 h. A preferred butylacrylate latex is known as AcryGen 4096D and is produced by GenCorp Performance Chemicals [Fitchburg, Mass.].

A second latex can be incorporated into the formulation with beneficial results. The latex is preferably stable in a pH range of 7–9. Films cast from the neat latex at a temperature of 20° C. preferably have a $T_g$ of 20–40° C. The films exhibit 0–1% swell upon soaking in water at a temperature of 20° C. for 48 h. A preferred second latex is known as Rhoplex CS4000 and is produced by the Rohm and Haas Company [Philadelphia, Pa.]. Use of this second latex significantly reduces the degree of tack in the edge sealant, and thus helps to reduce the risk of tongue-and-grooved clicking in the field. Higher levels of the first and second latex substantially reduces the risk of color crocking in the field.

The solution of wax in oil consists of a hydrophobic wax (10–80% by weight) with a melting point in the range of 30–70° C. and a hydrophobic oil (20–90% by weight) with a melting point that is less than 20° C. The melting point of the mixture should be in the range of 25–70° C. Suitable waxes include paraffin wax, scale wax, slack wax, lanolin and hydrogenated soybean oil. Suitable oils include soybean oil, sunflower oil, castor oil, rapeseed oil, safflower oil, corn oil, linseed oil, tung oil, and 1-octadecene. It is important that the solution of wax in oil have a freezing point that is in the range of 30–60° C., while a freezing point in the range of 35–45° C. is preferred. A preferred solution of wax in oil is comprised of soybean oil (40–70% by weight) and paraffin wax (60–30% by weight).

The surfactant based on salts of long-chain organic acids can be prepared from bases, such as morpholine, triethanolamine, ammonia, and sodium carbonate; and long chain organic acids, such as stearic acid, palmitic acid, myristic acid, and lauric acid. A preferred surfactant is a salt based on morpholine and a mixture stearic and palmitic acids. The ratio of base to organic acid should be balanced on a molar basis. The amount of surfactant used had a significant effect on the stability of the formulation. Excessive amounts of surfactant can result in a frothy formulation and poor differential edge swell value of OSB treated with the sealant.

Viscosifying agents are exemplified by relatively nonionic polysaccharides such as carboxymethylcellulose or hydroxyethylcellulose. A preferred viscosifying agent is known as Natrosol 250 MBR hydroxyethylcellulose and is produced by Hercules, Incorporated [Wilmington, Del.]. Higher levels of viscosifying agent can be used to reduce overspray without adversely effecting the differential edge swell values for OSB treated with said sealant.

Emulsifying agents are generally based on long chain aliphatic compounds with alcohol and/or ester functionality. A preferred emulsifying agent is stearyl alcohol. The emulsifying agent can be used to improve the stability of the formulation. Excessive levels of emulsifying agent can result in unacceptably high viscosity values and poor differential edge swell values for OSB treated with said sealant.

Dispersing aids can be beneficial for use in conjunction with pigments or powders. A preferred dispersing aid is known as Surfynol 104PA and is produced by the Air Products and Chemical Corporation [Allentown, Pa.].

Colorants that are most suitable for this invention include water-based pigment dispersions, such as those manufactured by the Sun Chemical Corporation [Amelia, Ohio.], and oil-based pigment dispersions, such as those produced by the Harwick Chemical Manufacturing Corporation [Cuyahoga Falls, Ohio.].

Opacifying agents are exemplified by titanium dioxide powder such as that known as Tronox CR-826 and produced by the Kerr-McGee Chemical Corporation [Oklahoma City, Okla.].

A suitable preservative for the formulation is known as Dowicil 75 and is produced by DOW Incorporated [Midland, Mich.].

A suitable coalescing agent for the formulation is known as Texanol and is produced by the Eastman Chemical Company [Kingsport, Tenn.].

The OSB adhesive wet strength agents are compounds that can interact with the OSB adhesive at the edge of the OSB panel in a manner that increases the wet strength of the strand-to-strand bonds. One example of such an agent is sodium borate, which is able to complex with partially cured phenolic resins and drastically reduces the propensity of the resin to hydrate. Sodium borate salts are conveniently prepared by combining aqueous solutions of boric acid and sodium hydroxide. The use of the sodium borate additive significantly decreases the differential edge swell values of OSB bonded with PF resin and treated with said sealant. Excessive levels of the sodium borate in the formulation does result in phase separation.

In one embodiment, the edge sealant formulation includes water (25–60% by weight); a viscosifying agent (0.1–0.8% by weight); a butylacrylate latex (10–25% by weight); an acrylic latex (10–25% by weight); an alkali borate salt (0.5–1.0% by weight); a water-soluble base (0.5–1.0% by weight); a preservative (0.01–0.1% by weight), a dispersing agent (0.01–0.1% by weight), an opacifying agent (0.1–1.0% by weight), colorants (1.0–15.0% by weight); and wax (5.0–15% by weight), oil (5.0–15% by weight), emulsifying agent (0.1–1.0% by weight), and a long chain organic acid (1.0–4.0% by weight).

In another embodiment, the edge sealant formulation includes water (45–55% by weight); a viscosifying agent (0.3–0.6% by weight); a butylacrylate latex (12–15% by weight); an acrylic latex (12–15% by weight); an alkali borate salt (0.8–1.0% by weight); a water-soluble base (0.5–0.8% by weight); a preservative (0.01–0.04% by weight), a dispersing agent (0.01–0.05% by weight), an opacifying agent (0.6–0.8% by weight), colorants (10–15% by weight); and wax (8.0–10% by weight), oil (10–13% by weight), emulsifying agent (0.6–1.0% by weight), and a long chain organic acid (3.0–4.0% by weight).

The following examples are provided to illustrate, not limit, the invention.

EXAMPLES

Example 1

A representative edge sealant formulation was prepared by the following procedure. A 1 L Waring blender was charged with warm water (55° C.; 378.8 g) and a hydroxyethylcellulose powder (4.0 g), known as Natrosol 250MBR from Hercules Incorporated [Wilmington, Del.]. The mixture was stirred at the highest rate of shear for 30 s. An aqueous 30% ammonium hydroxide solution (4.0 g) was then added to the blender and the contents were stirred at the highest rate of shear for 30 s. A preservative (0.4 g), known as Dowicil 75 from Dow Chemical Incorporated [Midland, Mich.] was then added to the blender and the contents were stirred at the lowest rate of shear for 30 s. A dispersing aid (1.0 g) comprised of an acetylenic diol in isopropyl alcohol, known as Surfynol 104PA from Air Products and Chemicals, Incorporated [Allentown, Pa.] was then added to the blender and the contents were stirred at the lowest rate of shear for 15 s. Titanium dioxide (5.0 g), known as Tronox CR-822 from the Kerr-McGee Chemical Corporation [Oklahoma City, Okla.], was then added to the blender and the contents were stirred at the highest rate of shear for 90 s. A butylacrylate/styrene polymer latex (15.0 g) with a $T_g$ of −13° C. and a percent solids level of 45%, known as AcryGen 4660, which is produced by GenCorp Performance Chemicals [Fitchburg, Mass.], was then added to the blender and the contents were stirred at the lowest rate of shear for 30 s. A hot, fresh solution (80° C.; 180.0 g) of paraffin wax (80.0 parts by weight), known as IGI 1230 from the International Group, Incorporated [Wayne, Pa.], and thermally modified linseed oil (160.0 parts by weight) known as Archer-1 from the Archer Daniels Midland Company [Redwing, Minn.], was then added to the blender and the contents were stirred at the highest rate of shear for 90 s. An aqueous #12 21090 diarylide yellow pigment dispersion (11.3 g), known as Sunsperse YFD 2193 from the Sun Chemical Corporation [Amelia, Ohio.] was then added to the blender and the contents were stirred at the highest rate of shear for 30 s. An aqueous #15:3 74160 phthalo blue pigment dispersion (2.7 g), known as Sunsperse BHD 6000 from the Sun Chemical Corporation [Amelia, Ohio.] was then added to the blender and the contents were stirred at the highest rate of shear for 30 s. Ethylene glycol monobutylether (10.0 g) from Dow Chemical Incorporated [Midland, Mich.] was then added to the blender and the contents were stirred at the lowest rate of shear for 30 s. A butylacrylate/styrene polymer latex (387.8 g) with a $T_g$ of −11° C. and a percent solids level of 50%, known as AcryGen 4096D, which is produced by GenCorp Performance Chemicals [Fitchburg, Mass.], was then added to the blender and the contents were stirred at the lowest rate of shear for 30 s.

The resulting liquid formulation was then transferred into a closed plastic container, which was stored at a temperature of 20° C. When the temperature of the formulation had decreased to 20–25° C., the viscosity of the formulation was measured by use of an Electronic Thomas Stormer Viscometer by the Cannon Instrument Company of State College, Pa. and was found to be about 58 KU. The percent solids value of the formulation was about 40%. When the formulation was applied to a wooden substrate it dried into a coating that had a green color that was similar to the green color of a dried film from the aforementioned PF 6014-13 sealant formulation (Associated Chemist Incorporated). The dried coating was highly elastic and sticky to the touch.

Application of Formulation to OSB Panels. Two OSB subfloor panels that were manufactured at the Weyerhaeuser OSB mill located in Edson, AB, Canada during the summer months of 1997 were obtained and the outer 6 inches of each panel was removed by use of a saw. The remaining interior portions of the panels were cut into square-shaped sections (12×12 inches) (60 count). The total group of sections was randomized thoroughly and two subgroups of ten sections each were isolated. One of these subgroups was not treated and was designated as a control group. The control group samples were immediately transferred into an environmental chamber (50% R.H., 20° C.) where they were stacked in an alternating configuration with spacers and allowed to equilibrate for a period of 14 h prior to testing. The second subgroup of sections, designated as the Weyerhaeuser group, was spray coated with the liquid edge sealant described. in this example on the section edges at a spread rate of 43 wet lb per Msqft. These samples were stacked in an alternating configuration with spacers and immediately transferred into an environmental chamber (50% R.H., 20° C.) where the coating dried for a period of 14 h prior to testing. These samples were subjected to the following edge swell test.

Two-Day Soak Test. Initial caliper measurements were made on each edge of each sample at the midpoint. Caliper measurements were also made at midpoint locations proximal from each edge by 4.0 inches. Each point of caliper measurement was marked with a pen so that subsequent measurements could be made at exactly the same location. The caliper measurements were made by use of a Mitutoyo Digimatic Indicator [#543-525A] which was mounted to a base with a circular foot (1.0 inch in diameter) and circular top (1.0 inch in diameter) from the B.C. Ames Co.; Waltham, Mass. The signal from these measurements was sent directly to an IBM computer and stored in a series of data files which was then imported into an EXCEL program.

Each sample was placed in a continuous water soak testing apparatus. The panel sections were secured 1.0 inch beneath the water line by use of metal pipes, which spanned across the surface of the tank. Tap water was preheated to a temperature of 72 F. and was pumped into the front end of the tank at a flow rate of about 10 gallons per hour. An open pipe, which was installed at the back end of the tank and was connected to a drain was positioned at a height within the tank so that the water line was always 1.0 inch above the top of the panel sections. The excess water was removed via this drain pipe.

After 24 h of soaking, each of the samples was removed from the bath and was measured for caliper at each of the previously measured locations. These caliper measurements were conducted within 2 h of removing the samples from the bath. The samples were then immediately returned to the soak tank.

At the 48 h point, the samples were once again removed from the tank and measured for caliper at each of the previously measured locations. These measurements were conducted within 2 h of removing the samples from the water.

Each sample was then dried for 24 h in a forced air oven which was set at a temperature of 83° C. A final set of caliper measurements was made on each panel section within 2 h of removing them from the oven.

Calculations: The following values were calculated for each edge of each sample for each point in time of the experiment.

Percent Thickness Swell: % edge thickness swell=[(edge caliper at time t)/(initial edge caliper)]×100%

% 4 inches thickness swell=[(4 inches caliper at time t)/(initial 4 inches caliper)]×100%

Differential Edge Swell: DES (4 inches)=(edge caliper at time t)−(4 inches caliper at time t)

A separate set of calculations was performed for each day of the experiment (e.g., day 0, 1, 2, and 3).

Average swell values for each section (1 foot×1 foot) were calculated by averaging the four values associated with each edge in the sample. These averaged values were assumed to represent an 'n' of one for statistical calculations. Thus, the 'n' of each group was assumed to be 10.

The average values and standard deviation values for each parameter in each group were calculated. The average values associated with different edge treatments were compared based on a difference between two means two-tailed students "t" test [A.S.C. Ehrenberg, *Data Reduction: Analysing and Interpreting Statistical Data*, 302–304, John Wiley & Sons, New York, N.Y. (1978)]. These results are shown in Tables 1 and 2.

TABLE 1

Example 1 percent thickness swell values at sample edges.

| CONDITIONING TIME (DAYS) | THICKNESS SWELL OF CONTROL GROUP | THICKNESS SWELL OF WEYERHAEUSER SEALANT GROUP |
| --- | --- | --- |
| 0 | 0 | 0 |
| 1 | 13.3[a] (1.2) | 9.0[b] (0.8) |
| 2 | 17.0[a] (1.2) | 13.3[b] (0.8) |
| 3 (redry) | 10.0[a] (1.0) | 7.3[b] (0.7) |

Note: numbers in parenthesis are standard deviation values. Those thickness swell values in a row that do not share a common superscript are significantly ($p < 0.05$) distinct at a 95% confidence interval.

TABLE 2

Example 2 differential edge swell values (mils).

| CON- DITIONING TIME (DAYS) | DIFFERENTIAL EDGE SWELL OF CONTROL GROUP | DIFFERENTIAL EDGE SWELL OF WEYERHAEUSER SEALANT GROUP |
| --- | --- | --- |
| 0 | 6[a] (0) | 7[b] (1) |
| 1 | 58[a] (8) | 31[b] (7) |
| 2 | 65[a] (10) | 43[b] (9) |
| 3 (redry) | 34[a] (8) | 19[b] (8) |

Note: numbers in parenthesis are standard deviation values. Those differential edge swell values in a row that do not share a common superscript are significantly ($p < 0.05$) distinct at a 95% confidence interval.

Example 2

A representative edge sealant was prepared by the following procedure. A 1 L Waring blender was charged with hot water (70° C.; 356.0 g) and a hydroxyethylcellulose powder (3.0 g), known as Natrosol 250MBR from Hercules Incorporated Aqualon Division [Wilmington, Del.]. The mixture was stirred at the highest rate of shear for 30 s. An aqueous 50% morpholine solution (6.0 g) was then added to the blender and the contents were stirred at the highest rate of shear for 30 s. A preservative (0.4 g), known as Dowicil 75 from Dow Chemical Incorporated [Midland, Mich.] was then added to the blender and the contents were stirred at the lowest rate of shear for 30 s. A dispersing aid (0.5 g) comprised of an acetylenic diol in isopropyl alcohol, known as Surfynol 104PA from Air Products and Chemicals, Incorporated [Allentown, Pa.] was then added to the blender and the contents were stirred at the lowest rate of shear for 15 s. Titanium dioxide (3.5 g), known as Tronox CR-822 from the Kerr-McGee Chemical Corporation [Oklahoma City, Okla.], was then added to the blender and the contents were stirred at the highest rate of shear for 90 s. An aqueous #12 21090 diarylide yellow pigment dispersion (13.6 g), known as Sunsperse YFD 2193 from the Sun Chemical Corporation [Amelia, Ohio.] was then added to the blender and the contents were stirred at the highest rate of shear for 30 s. An aqueous #15:3 74160 phthalo blue pigment dispersion (3.0 g), known as Sunsperse BHD 6000 from the Sun Chemical Corporation [Amelia, Ohio.] was then added to the blender and the contents were stirred at the highest rate of shear for 30 s. A green oil-based pigment dispersion (12.0 g), known as Stan-Tone HCC 25012 from the Harwick Chemical Manufacturing Corporation [Cuyahoga Falls, Ohio.] was then added to the blender and the contents were stirred at the highest rate of shear for 90 s. A hot, fresh solution (80° C.; 233.0 g) of paraffin wax (122.0 g), known as IGI 1230 from the International Group, Incorporated [Wayne, Pa.], soybean oil (125.0 g) from the Archer Daniels Midland Company [Redwing, Minn.], 1-octadecanol (3.0 g), and a mixture of long-chain carboxylic acids (92% stearic acid and palmitic acid) (50.0 g) known as Pristerene 4910 from Uniquema [Chicago, Ill.] was then added to the blender and the contents were stirred at the highest rate of shear for 90 s. A butylacrylate/styrene polymer latex (150.0 g) with a $T_g$ of −11° C. and a percent solids level of 50%, known as AcryGen 4096D from GenCorp Performance Chemicals [Fitchburg, Mass.], was then added to the blender and the contents were stirred at the lowest rate of shear for 30 s. An acrylic polymer latex (135.0 g) with a $T_g$ of 32° C. and a percent solids level of 48%, known as Rhoplex CS-4000 from the Rohm and Haas Company [Philadelphia, Pa.], was then added to the blender and the contents were stirred at the lowest rate of shear for 30 s. Water (84.0 g) was then added to the blender and the contents were stirred at the lowest rate of shear for 30 s.

The resulting liquid formulation was then transferred into a closed plastic container, which was stored at a temperature of 20° C. When the temperature of the formulation had decreased to 20–25° C. the viscosity of the formulation was measured by use of a Brookfield viscometer. The percent solids value of the formulation was measured and found to be about 40%. When the formulation was applied to a wooden substrate it dried into a coating that had a green color that was similar to the green color of a dried film from the aforementioned PF 6014-13 sealant formulation (Associated Chemist Incorporated). The dried coating was highly elastic and slightly tacky.

Application of Formulation to OSB Panels

Three OSB subfloor panels that were manufactured at the Weyerhaeuser OSB mill located in Edson, AB, Canada during the fall months of 1999 were obtained and the outer 6 inches of each panel were removed by use of a saw. The remaining interior portions of the panels were cut into square shaped sections (12 inches×12 inches) (90 count). The total group of sections was randomized thoroughly and six subgroups of ten sections each were isolated. One of these subgroups was not treated and was designated as a control group.

The control group samples were immediately transferred into an environmental chamber (50% R.H., 20° C.) where they were stacked in an alternating configuration with spacers and allowed to equilibrate for a period of 14 h prior to testing.

The second group of sections was stacked and the edges of the stack were spray coated with the liquid edge sealant described in this example at a spread rate of 43 wet lb per Msqft.

The third, fourth and fifth groups were each stacked and spray coated on the edges with commercially available OSB edge sealants at a spread rate of 43 wet lb per Msqft. All coated samples were then stacked in an alternating configuration with spacers and immediately transferred into an environmental chamber (50% R.H., 20° C.) where the coatings dried for a period of 14 h prior to testing. These samples were then subjected to the edge swell test described in Example 1.

TABLE 3

Example 2 Brookfield viscosity* values of OSB edge sealants.

| EDGE SEALANT FORMULATION | VISCOSITY (cps) |
| --- | --- |
| Weyerhaeuser Example 2 | 8780 |
| Associated Chemists, Inc. PF6014-13 | 2600 |
| Societe Laurentide Inc. 474-280 | 4060 |
| The Reynolds Company 100-47 | 3150 |

*Note: Spindle #3, 10 rpm, 20° C.

TABLE 4

Example 2 percent thickness swell values at sample edges.

| CONDITIONING TIME (DAYS) | Control No sealant | Weyerhaeuser Example 2 | Associated Chemists Inc. PF6014-13 | Societe Laurentide Inc. 474-280 | The Reynolds Co. 100-47 |
| --- | --- | --- | --- | --- | --- |
| 0 | 0 | 0 | 0 | 0 | 0 |
| 1 | $11.8^a$ (0.86) | $8.53^b$ (0.69) | $8.24^b$ (1.17) | $9.58^c$ (0.75) | $9.59^c$ (1.11) |
| 2 | $15.0^a$ (0.79) | $12.3^b$ (0.76) | $11.8^b$ (0.95) | $13.0^{bc}$ (0.82) | $13.3^c$ (1.15) |
| 3 (redry) | $7.93^a$ (0.68) | $6.36^b$ (0.92) | $6.13^b$ (0.77) | $7.14^c$ (0.61) | $7.15^c$ (0.70) |

Note: numbers in parenthesis are standard deviation values. Those thickness swell values in a row that do not share a common superscript are significantly ($p < 0.05$) distinct at a 95% confidence interval.

TABLE 5

Example 2 differential edge swell values (mils).

| CONDITIONING TIME (DAYS) | Control No sealant | Weyerhaeuser Example 2 | Associated Chemists Inc. PF6014-13 | Societe Laurentide Inc. 474-280 | The Reynolds Co. 100-47 |
| --- | --- | --- | --- | --- | --- |
| 0 | $2^a$ (1) | $5^b$ (1) | $4^c$ (1) | $5^b$ (2) | $3^d$ (1) |
| 1 | $47^a$ (6) | $26^{bd}$ (5) | $23^b$ (7) | $33^c$ (6) | $31^{cd}$ (6) |
| 2 | $55^a$ (7) | $37^b$ (6) | $32^b$ (7) | $43^c$ (4) | $42^{cd}$ (8) |
| 3 (redry) | $25^a$ (5) | $14^b$ (6) | $14^b$ (7) | $21^c$ (3) | $20^c$ (5) |

Note: numbers in parenthesis are standard deviation values. Those differential edge swell values in a row that do not share a common superscript are significantly ($p < 0.05$) distinct at a 95% confidence interval.

Example 3

Two representative edge sealant formulations were prepared by the following procedures.

Sealant 3A. A 2 gallon blender equipped with an Arde Barinco rotor stator (down mode) was charged with hot water (70° C.; 2252.0 g) and a hydroxyethylcellulose powder (22.0 g), known as Natrosol 250MBR from Hercules Incorporated Aqualon Division [Wilmington, Del.]. The mixture was agitated for 20 minutes at 50% of maximum power. An aqueous 50% morpholine solution (36.0 g) was then added to the blender and the contents were agitated for 5 minutes at 50% of maximum power. A preservative (2.4 g), known as Dowicil 75 from Dow Chemical Incorporated [Midland, Mich.] was then added to the blender and the contents were agitated for 5 minutes at 50% of maximum power. A dispersing aid (3.0 g) comprised of an acetylenic diol in isopropyl alcohol, known as Surfynol 104PA from Air Products and Chemicals, Incorporated [Allentown, Pa.] was then added to the blender and the contents were agitated for 5 minutes at 50% of maximum power. Titanium dioxide (21.0 g), known as Tronox CR-826 from the Kerr-McGee Chemical Corporation [Oklahoma City, Okla.], was then added to the blender and the contents were agitated for 10 minutes at 50% of maximum power. An aqueous #12 21090 diarylide yellow pigment dispersion (73.2 g), known as Sunsperse YFD 2193 from the Sun Chemical Corporation [Amelia, Ohio.] was then added to the blender and the contents were agitated for 5 minutes at 50% of maximum power. An aqueous #15:3 74160 phthalo blue pigment dispersion (14.4 g), known as Sunsperse BHD 6000 from the Sun Chemical Corporation [Amelia, Ohio.] was then added to the blender and the contents were agitated for 5 minutes at 50% of maximum power. A green oil-based pigment dispersion (36.0 g), known as Stan-Tone HCC 25012 from the Harwick Chemical Manufacturing Corporation [Cuyahoga Falls, Ohio.] was then added to the blender and the contents were agitated for 5 minutes at 50% of maximum power. A hot, fresh solution (80° C.; 1500.0 g) of paraffin wax (844.0 g), known as IGI 1230 from the International Group, Incorporated [Wayne, Pa.], soybean oil (750.0 g) from the Archer Daniels Midland Company [Redwing, Minn.], 1-octadecanol (6.0 g), and a mixture of long-chain carboxylic acids (92% stearic acid and palmitic acid) (200.0 g) known as Pristerene 4910 from Uniquema [Chicago, Ill.] was then added to the blender and the contents were agitated for 20 minutes at 50% of maximum power. A butylacrylate/styrene polymer latex (750.0 g) with a $T_g$ of −11° C. and a percent solids level of 50%, known as AcryGen 4096D from GenCorp Performance Chemicals [Fitchburg, Mass.], was then added to the blender and the contents were agitated for 5 minutes at 30% of maximum power. An acrylic polymer latex (750.0 g) with a $T_g$ of 32° C. and a percent solids level of 48%, known as Rhoplex CS-4000 from the Rohm and Haas Company [Philadelphia, Pa.], was then added to the blender and the contents were agitated for 5 minutes at 30% of maximum power. Water (540.0 g) was then added to the blender and the contents were agitated for 5 minutes at 30% of maximum power.

The resulting liquid formulation was then transferred into a closed plastic container, which was stored at a temperature of 20° C. The percent solids value of the formulation was measured and found to be about 40%. When the formulation was applied to a wooden substrate it dried into a coating that had a green color that was similar to the green color of a dried film from the aforementioned PF 6014-13 sealant formulation (Associated Chemist Incorporated). The dried coating was highly elastic and slightly tacky.

Sealant 3B. A 2 gallon blender equipped with an Arde Barinco rotor stator (down mode) was charged with hot water (70° C.; 2249.0 g) and a hydroxyethyl-cellulose powder (25.0 g), known as Natrosol 250MBR from Hercules Incorporated Aqualon Division [Wilmington, Del.]. The mixture was agitated for 20 minutes at 50% of maximum power. An aqueous 50% morpholine solution (36.0 g) was then added to the blender and the contents were agitated for 5 minutes at 50% of maximum power. A preservative (2.4 g), known as Dowicil 75 from Dow Chemical Incorporated [Midland, Mich.] was then added to the blender and the contents were agitated for 5 minutes at 50% of maximum power. A dispersing aid (3.0 g) comprised of an acetylenic diol in isopropyl alcohol, known as Surfynol 104PA from Air Products and Chemicals, Incorporated [Allentown, Pa.] was then added to the blender and the contents were agitated for 5 minutes at 50% of maximum power. Titanium dioxide (21.0 g), known as Tronox CR-826 from the Kerr-McGee Chemical Corporation [Oklahoma City, Okal.], was then added to the blender and the contents were agitated for 10 minutes at 50% of maximum power. An aqueous #12 21090 diarylide yellow pigment dispersion (73.2 g), known as Sunsperse YFD 2193 from the Sun Chemical Corporation [Amelia, Ohio.] was then added to the blender and the contents were agitated for 5 minutes at 50% of maximum power. An aqueous #15:3 74160 phthalo blue pigment dispersion (14.4 g), known as Sunsperse BHD 6000 from the Sun Chemical Corporation [Amelia, Ohio.] was then added to the blender and the contents were agitated for 5 minutes at 50% of maximum power. A green oil-based pigment dispersion (36.0 g), known as Stan-Tone HCC 25012 from the Harwick Chemical Manufacturing Corporation [Cuyahoga Falls, Ohio.] was then added to the blender and the contents were agitated for 5 minutes at 50% of maximum power. A hot, fresh solution (80° C.; 1500.0) of paraffin wax (844.0 g), known as IGI 1230 from the International Group, Incorporated [Wayne, Pa.], soybean oil (750.0 g) from the Archer Daniels Midland Company [Redwing, Minn.], 1-octadecanol (6.0 g), and a mixture of long-chain carboxylic acids (92% stearic acid and palmitic acid) (200.0 g) known as Pristerene 4910 from Uniquema [Chicago, Ill.] was then added to the blender and the contents were agitated for 20 minutes at 50% of maximum power. A solution (540.0 g) of water (856.0 g), boric acid (64.0 g) and 50% sodium hydroxide (80.0 g) was then added to the blender and the contents were agitated for 5 minutes at 30% of maximum power. A butylacrylate/styrene polymer latex (750.0 g) with a $T_g$ of −11° C. and a percent solids level of 50%, known as AcryGen 4096D from GenCorp Performance Chemicals [Fitchburg, Mass.], was then added to the blender and the contents were agitated for 5 minutes at 30% of maximum power. An acrylic polymer latex (750.0 g) with a $T_g$ of 32° C. and a percent solids level of 48%, known as Rhoplex CS-4000 from the Rohm and Haas Company [Philadelphia, Pa.], was then added to the blender and the contents were agitated for 5 minutes at 30% of maximum power.

The resulting liquid formulation was then transferred into a closed plastic container, which was stored at a temperature of 20° C. The percent solids value of the formulation was measured and found to be about 40%. The formulation was stable in excess of three months at a temperature of 20° C. When the formulation was applied to a wooden substrate it dried into a coating that had a green color that was similar to the green color of a dried film from the aforementioned PF 6014-13 sealant formulation (Associated Chemist Incorporated). The dried coating was highly elastic and slightly tacky.

Application of Formulations to OSB Panels. Two OSB subfloor panels that were manufactured at the Weyerhaeuser OSB mill located in Grayling, Mich. during the fall months of 1999 were obtained and the outer 6 inches of each panel were removed by use of a saw. This OSB contained a PF resin in both the surface and core layers. The remaining interior portions of the panels were cut into square shaped sections (12 inches×12 inches) (60 count). The total group of sections was randomized thoroughly and four sub-groups of ten sections each were isolated. One of these subgroups was not treated and was designated as a control group.

The control group samples were immediately transferred into an environmental chamber (50% R.H., 20° C.) where they were stacked in an alternating configuration with spacers and allowed to equilibrate for a period of 14 h prior to testing.

A second group of sections was stacked and the edges of the stack were spray coated with the liquid edge sealant described in this example and labeled as '3A' at a spread rate of 43 wet lb per Msqft.

A third group of sections was stacked and the edges of the stack were spray coated with the liquid edge sealant described in this example and labeled as '3B' at a spread rate of 43 wet lb per Msqft.

A fourth group of sections was stacked and the edges of the stack were spray coated with a liquid edge sealant known as PF6014-13 from Associated Chemists Inc. at a spread rate of 43 wet lb per Msqft.

All coated samples were then stacked in an alternating configuration with spacers and immediately transferred into an environmental chamber (50% R.H., 20° C.) where the coatings dried for a period of 14 h prior to testing. These samples were then subjected to the edge swell test described in Example 1.

preservative (2.4 g), known as Dowicil 75 from Dow Chemical Incorporated [Midland, Minn.] was then added to the blender and the contents were agitated for 5 minutes at 50% of maximum power. A dispersing aid (3.0 g) comprised of an acetylenic diol in isopropyl alcohol, known as Surfynol 104PA from Air Products and Chemicals, Incorporated [Allentown, Pa.] was then added to the blender and the contents were agitated for 5 minutes at 50% of maximum power. Titanium dioxide (20.0 g), known as Tronox CR-826 from the Kerr-McGee Chemical Corporation [Oklahoma City, Okal.], was then added to the blender and the contents were agitated for 10 minutes at 50% of maximum power. An aqueous #12 21090 diarylide yellow pigment dispersion (66.0 g), known as Sunsperse YFD 2193 from the Sun Chemical Corporation [Amelia, Ohio.] was then added to the blender and the contents were agitated for 5 minutes at 50% of maximum power. An aqueous #15:3 74160 phthalo blue pigment dispersion (13.0 g), known as Sunsperse BHD 6000 from the Sun Chemical Corporation [Amelia, Ohio.] was then added to the blender and the contents were agitated for 5 minutes at 50% of maximum power. A green oil-based pigment dispersion (33.0 g), known as Stan-Tone HCC 25012 from the Harwick Chemical Manufacturing Corporation [Cuyahoga Falls, Ohio.] was then added to the blender and the contents were agitated for 5 minutes at 50% of maximum power. A hot, fresh solution (80° C.; 1600.0 g) of

TABLE 6

Example 3 percent thickness swell values at sample edges (Grayling OSB).

| CONDITIONING TIME (DAYS) | Control No sealant | Weyerhaeuser Example 3A | Weyerhaeuser Example 3B | Associated Chemists Inc. PF6014-13 |
|---|---|---|---|---|
| 0 | 0 | 0 | 0 | 0 |
| 1 | $12.3^a$ (0.90) | $10.3^b$ (1.50) | $8.84^c$ (1.11) | $9.03^c$ (0.65) |
| 2 | $17.0^a$ (1.36) | $14.6^{bc}$ (1.36) | $13.6^b$ (1.57) | $14.9^c$ (0.81) |
| 3 (redry) | $11.2^a$ (1.38) | $9.23^b$ (1.40) | $8.54^b$ (1.42) | $10.7^a$ (0.97) |

Note: numbers in parenthesis are standard deviation values. Those thickness swell values in a row that do not share a common superscript are significantly ($p < 0.05$) distinct at a 95% confidence interval.

TABLE 7

Example 3 differential edge swell values (mils) (Grayling OSB).

| CONDITIONING TIME (DAYS) | Control No sealant | Weyerhaeuser Example 3A | Weyerhaeuser Example 3B | Associated Chemists Inc. PF6014-13 |
|---|---|---|---|---|
| 0 | $1^a$ (1) | $2^{ab}$ (2) | $3^b$ (2) | $2^{ab}$ (2) |
| 1 | $49^a$ (7) | $32^b$ (9) | $23^c$ (10) | $23^c$ (4) |
| 2 | $62^a$ (11) | $43^b$ (8) | $38^b$ (13) | $43^b$ (5) |
| 3 (redry) | $48^a$ (11) | $32^{bc}$ (8) | $28^b$ (13) | $39^{ac}$ (7) |

Note: numbers in parenthesis are standard deviation values. Those differential edge swell values in a row that do not share a common superscript are significantly ($p < 0.05$) distinct at a 95% confidence interval.

Example 4

A representative edge sealant formulation was prepared by the following procedure. A 2 gallon blender equipped with an Arde Barinco rotor stator (down mode) was charged with hot water (70° C.; 2664.6 g) and a hydroxyethylcellulose powder (19.0 g), known as Natrosol 250MBR from Hercules Incorporated Aqualon Division [Wilmington, Del.]. The mixture was agitated for 20 minutes at 50% of maximum power. An aqueous 50% morpholine solution (36.0 g) was then added to the blender and the contents were agitated for 5 minutes at 50% of maximum power. A paraffin wax (576.0 g), known as IGI 1230 from the International Group, Incorporated [Wayne, Pa.], soybean oil (924.0 g) from the Archer Daniels Midland Company [Redwing, Minn.], hydrogenated soybean oil (60.0 g) known as Natura Shield ASW-220 from the Archer Daniels Midland Company [Redwing, Minn.], and a mixture of long-chain carboxylic acids (92% stearic acid and palmitic acid) (240.0 g) known as Pristerene 4910 from Uniquema [Chicago, Ill.] was then added to the blender and the contents were agitated for 20 minutes at 50% of maximum power. A solution (540.0 g) of water (856.0 g), boric acid (64.0 g) and 50% sodium hydroxide (80.0 g) was then added to the blender and the contents were agitated for 5 minutes at 30% of maximum power. A butylacrylate/styrene polymer latex (550.0 g) with a $T_g$ of $-11°$ C. and a percent solids level of 50%, known as AcryGen 4096D from GenCorp Performance Chemicals [Fitchburg, Mass.], was then added to the blender and the contents were agitated for 5 minutes at 30% of maximum power. An acrylic polymer latex (450.0 g) with a $T_g$ of 32° C. and a percent solids level of 48%, known as Rhoplex CS-4000 from the Rohm and Haas Company [Philadelphia, Pa.], was then added to the blender and the contents were agitated for 5 minutes at 30% of maximum power.

The resulting liquid formulation was then transferred into a closed plastic container, which was stored at a temperature of 20° C. The percent solids value of the formulation was measured and found to be about 38%. The formulation was stable in excess of two months at a temperature of 20° C.

A second and third group of sections were stacked and the edges of each stack were spray coated with the liquid edge sealant described in this example at a spread rate of 43 wet lb per Msqft.

A fourth group of sections was stacked and the edges of the stack were spray coated with a liquid edge sealant known as PFX99L94A from Associated Chemists Inc. at a spread rate of 43 wet lb per Msqft.

All coated samples were then stacked in an alternating configuration with spacers and immediately transferred into an environmental chamber (50% R.H., 20° C. where the coatings dried for a period of 14 h prior to testing. These samples were then subjected to the edge swell test described in Example 1.

TABLE 8

Example 4 percent thickness swell values at sample edges (Edson OSB).

| CONDITIONING TIME (DAYS) | Control No sealant | Weyerhaeuser Example 4 (replicate 1) | Weyerhaeuser Example 4 (replicate 2) | Associated Chemists Inc. PFX99L94A |
|---|---|---|---|---|
| 0 | 0 | 0 | 0 | 0 |
| 1 | $12.4^a$ (0.69) | $7.83^b$ (0.55) | $7.89^b$ (0.80) | $7.78^b$ (0.74) |
| 2 | $14.8^a$ (0.77) | $11.0^b$ (1.02) | $10.6^b$ (1.39) | $10.9^b$ (1.14) |
| 3 (redry) | $7.52^a$ (0.56) | $5.20^b$ (0.88) | $5.07^b$ (1.43) | $5.61^b$ (0.85) |

Note: numbers in parenthesis are standard deviation values. Those thickness swell values in a row that do not share a common superscript are significantly ($p < 0.05$) distinct at a 95% confidence interval.

TABLE 9

Example 4 differential edge swell values (mils) (Edson OSB).

| CONDITIONING TIME (DAYS) | Control No sealant | Weyerhaeuser Example 4 (replicate 1) | Weyerhaeuser Example 4 (replicate 2) | Associated Chemists Inc. PFX99L94A |
|---|---|---|---|---|
| 0 | $7^a$ (1) | $8^b$ (1) | $8^b$ (1) | $8^b$ (1) |
| 1 | $54^a$ (7) | $22^b$ (3) | $22^{bc}$ (5) | $18^c$ (4) |
| 2 | $60^a$ (6) | $32^b$ (5) | $31^b$ (9) | $31^b$ (8) |
| 3 (redry) | $29^a$ (5) | $10^b$ (5) | $14^b$ (8) | $14^b$ (6) |

Note: numbers in parenthesis are standard deviation values. Those differential edge swell values in a row that do not share a common superscript are significantly ($p < 0.05$) distinct at a 95% confidence interval.

When the formulation was applied to a wooden substrate it dried into a coating that had a green color that was similar to the green color of a dried film from the aforementioned PF 6014-13 sealant formulation (Associated Chemist Incorporated). The dried coating was highly elastic and slightly tacky.

Application of Formulation to OSB Panels. Two OSB subfloor panels that were manufactured at the Weyerhaeuser OSB mill located in Edson, AB Canada during the spring months of 2000 were obtained and the outer 6 inches of each panel were removed by use of a saw. The remaining interior portions of the panels were cut into square shaped sections (12 inches×12 inches) (60 count). The total group of sections was randomized thoroughly and four subgroups of ten sections each were isolated. One of these subgroups was not treated and was designated as a control group.

The control group samples were immediately transferred into an environmental chamber (50% R.H., 20° C.) where they were stacked in an alternating ion with spacers and allowed to equilibrate for a period of 14 h prior to testing.

While the preferred embodiment of the invention has been illustrated and described, it will be appreciated that various changes can be made therein without departing from the spirit and scope of the invention.

What is claimed is:

1. A wood-based panel treated with a composition for reducing edge swelling, the panel having first and second major surfaces and four edge surfaces, the four edge surfaces of the pane being treated with the composition, wherein the composition comprises (a) water, (b) a butylacrylate latex, (c) a wax, (d) an oil, wherein the wax is soluble in the oil, and wherein the oil is present in the composition in an amount from about 2 to about 30 percent by weight based on the total weight of the composition, and (e) a surfactant, wherein the surfactant comprises an organic acid salt.

2. The panel of claim 1, wherein the composition is applied to the edges at a spread rate of about 25–50 wet pounds per Msqft of edge surface area and dried to yield a residue that substantially reduces differential edge swell.

3. The panel of claim 1, wherein the composition comprises water in an amount from about 20 to about 60 percent by weight based on the total weight of the composition; butylacrylate latex in amount from about 10 to about 25 percent by weight based on the total weight of the composition; wax in an amount from about 1 to about 25 percent by weight based on the total weight of the composition; and a surfactant in an amount from about 1 to about 5 percent by eight based on the total weight of the composition.

4. The panel of claim 1, wherein the composition further comprises a second latex.

5. The panel of claim 1, wherein the composition further comprises an alkali borate salt.

* * * * *

UNITED STATES PATENT AND TRADEMARK OFFICE
CERTIFICATE OF CORRECTION

PATENT NO. : 6,803,091 B2  
APPLICATION NO. : 10/606335  
DATED : October 12, 2004  
INVENTOR(S) : Winterowd et al.

It is certified that error appears in the above-identified patent and that said Letters Patent is hereby corrected as shown below:

Col. 18, Claim 1, line 56:

"of the pane being treated with the composition, wherein the" should read --of the panel being treated with the composition, wherein the--

Col. 19, Claim 3, line 7:

"eight based on the total weight of the composition" should read --weight based on the total weight of the composition--

Signed and Sealed this

Thirtieth Day of October, 2007

JON W. DUDAS  
*Director of the United States Patent and Trademark Office*